United States Patent
Haberman

(12) 
(10) Patent No.: US 6,213,211 B1
(45) Date of Patent: *Apr. 10, 2001

(54) USING OF STOKES LAW CEMENT SLURRIES FOR IMPROVED WELL CEMENTATION

(75) Inventor: John Phillip Haberman, Houston, TX (US)

(73) Assignee: John P. Haberman, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,083

(22) Filed: Feb. 26, 1998

(51) Int. Cl.$^7$ ..................................................... E21B 33/13
(52) U.S. Cl. ............................................ 166/292; 166/285
(58) Field of Search ................................. 166/292, 285, 166/309

(56) References Cited

U.S. PATENT DOCUMENTS

| | | | |
|---|---|---|---|
| 3,197,317 | * 7/1965 | Patchen | 166/292 |
| 3,804,058 | * 4/1974 | Messenger | 166/292 |
| 3,876,005 | * 4/1975 | Fincher et al. | 166/292 |
| 4,234,344 | * 11/1980 | Tinsley et al. | 106/672 |
| 4,370,166 | * 1/1983 | Powers et al. | 106/676 |
| 4,415,367 | * 11/1983 | Nelson | 106/718 |
| 5,806,594 | * 9/1998 | Stiles et al. | 166/293 |

OTHER PUBLICATIONS

Smith, Dwight K., "Cementing", Revised Edition 1987, Henry L. Doherty Memorial Fund of AIME, Society of Petroleum Engineers, pp. 9, 10, 21–23 and 29–31, 1987.*

Lester Charles Uren, Petroleum Production Engineering: Oil Field Development, McGraw–Hill, p. 480–498, 1956.*

* cited by examiner

Primary Examiner—George Suchfield
(74) Attorney, Agent, or Firm—Rosenthal & Osha L.L.P.

(57) ABSTRACT

A method for providing lower than normal API Class cement slurries for use in oil well cementing is disclosed. Rather than the use of any conventional density extenders for hydraulic cement, such as bentonite, only plain water is added to the selected normal API Class slurry to extend its density. The use of cement retarders, cement accelerators, or friction reducers for these purposes, but not for density extension, is contemplated also.

3 Claims, No Drawings

USING OF STOKES LAW CEMENT SLURRIES FOR IMPROVED WELL CEMENTATION

BACKGROUND OF THE INVENTION

In the operation of rotary drilling an oil or gas well, drilling fluid having a prescribed density is used during the drilling operation for several purposes including to balance the formation pressure which increases as the depth of the hole increases. Such drilling fluid or "mud" is pumped down the drill string, through the bit, and returned to the surface in the annulus between the drill pipe and the borehole wall. This process is known as "circulation" of the drilling fluid. If the density of the drilling fluid is excessive this can result in "breaking down" the formations encountered by the bit with the resultant loss of fluid into such broken down formations. This sort of condition results in the loss of the fluid communication path and a formation pressure overbalance, and is known as "lost circulation". Lost circulation can result in extensive well damage and is, altogether, an undesirable and possibly dangerous condition which must be avoided.

This condition may generally be avoided by appropriate selection of the density of the drilling fluid used. The fluid density of the drilling fluid or mud is usually controlled by the addition of heavy earth materials, such as barite, in known ratio to the fluid volume to produce a controlled, known density, mud.

When the well has "bottomed out" and is to be completed for production, it is necessary to set steel casing into the borehole to line the walls thereof in order to prevent caving in of the sidewalls. The steel casing, of course, must fit inside the hole diameter. This leaves an annulus between the outer surface of the casing and the borehole wall. This annulus is filled with oil well cement, having certain desired properties, in order to prevent fluid communication along the casing/borehole annulus. Such undesired fluid communication can result in well damage and loss of commercial production potential. The oil well cement is placed in the annulus between the casing and borehole wall by pumping a highly fluid cement slurry down a string of production tubing and out, either the casing bottom, or perforations in the casing and into the casing/borehole annulus. The volume of cement necessary to fill the annulus may be calculated since the outer diameter of the casing and the borehole diameter are known. Again, however, the density of such cement fluid slurries cannot exceed certain limits or the "lost circulation" condition will be encountered. Thus it is necessary to be able to control the density of the oil well cement used in cementing operations, just as for the drilling fluid during the drilling operation.

Mixtures of certain proportions of water with well cements are called "normal density" slurries, where the slurry and the set cement have about optimum properties for pumping into wells. For example, the normal density of American Petroleum Institute (API) Class H cement slurry is 16.4 pounds per gallon (ppg). Normal density of Class G slurry 15.8 ppg and Class C slurry is 14.8 ppg. It is often necessary to use "extended slurries" of cement having lower density than a "normal" in order to prevent lost circulation due to excessive hydrostatic pressure when the slurry is pumped into the well. Extended slurries having densities of 12 ppg, or less, are routinely used. In fact most cement slurries used in the industry are extended slurries.

Most common low density, or extended, slurries are made by mixing excess water, compared to the amount for normal density slurries and additives, such as bentonite. The bentonite, a form of ground up high density clay, is used to prevent settling of the cement particles unduly, before the cement sets, or solidifies. Cement settling prior to setting is usually evaluated in the laboratory by the API free water test. In this test, the volume of free water which accumulates on the top of the cement slurry in a specified diameter 250 cubic centimeter (cc) graduated cylinder after setting for 2 hours at room temperature is determined. Current practice is to require that the free water be below some maximum amount, for example 5 cubic centimeter (cc).

BRIEF DESCRIPTION OF THE INVENTION

The present invention results from a study of cement settling calculations based on the Stokes-Einstein equation. These calculations show that the sedimentation rate of cement particles in water is relatively slow compared to the depth of a well. For example, a sedimentation (total) of about 50 feet in 4 hours was calculated for API Class C cement particles in fresh water.

An implication drawn from this is that if a low density API Class C slurry, using no bentonite in the water extender, is pumped into the casing/borehole annulus in a vertical well, that the top surface of the cement would settle about 50 feet by the time the cement has set. This degree of settling will not cause any operational problems. Thus the present invention is to apply oil well cement having API Classes known, and extending the density of such mixes purely by the addition of excess water, using no bentonite, or any other extender, to achieve a desired extended density. Such mixes are called "Stokes Law" mix. The resulting oil well cement slurries have numerous advantages discussed below, compared to prior art extended density slurries employing all extender.

The invention is best understood by the following detailed description of preferred embodiment. These descriptions are intended as descriptive, not limitative of the invention.

DETAILED DESCRIPTION OF A PREFERRED EMBODIMENT

One form of the Stokes-Einstein equation is given here:

$$V = \frac{2gr^2(dp - df)}{9\upsilon}$$

V=velocity, cm/sec
g=gravity, 980 cm/sec$^2$
r=particle radius, cm
dp=fluid density, g/cm$^3$ (particle)
df=fluid density, g/cm$^3$ (BH fluid)
$\upsilon$=fluid viscosity, poise.

Numerical solutions of this equation for different API Classes of oil well cement using plain water for the purpose of extending (lowering) the slurry density have shown that, compared to the depth of a well (i.e. the overall height of a cement annulus from casing bottom to well head) the sedimentation velocity (or rate) of cement particles in water is slow. In one specific preferred example using API class C cement particles in fresh water, a sedimentation amount in 12 hours was about 40 feet. Twelve hours represented the time required for the slurry to begin to solidify under the conditions of low density and temperature of the example.

Avoidance of the use of bentonite, as in prior art extenders has several advantages. Among these are:

1. Slurries are less expensive because of fewer components.
2. Slurries have predictable properties resulting in less pilot testing and quality control requirements.
3. The set cement has improved properties. For example, bentonite reduces the ability of cement to protect casing from corrosion.
4. The reduction or absence of gel strength development, combined with the settling motion of the cement particles maintains hydrostatic pressure after the cement is pumped, as it transitions from liquid slurry to a solid. This provides a better seal through producing zones.
5. Cement logs are improved.
6. Slurries have a more nearly Newtonian rheology (as compared to the extended slurries currently used which generally exhibit a Bingham Plastic rheology). Such slurries go into turbulent flow at lower pumping rates and improve the displacement of drilling fluid (in the casing/borehole annulus) by the cement slurry.

EXAMPLE OF USE IN FIELD WELL

It was proposed to cement a string of seismic detectors into an unused, existing well in a commercial field. The well was relatively shallow (about 800 feet). Unknown to the cementing contractor until his arrival at the wellsite was the fact that a lost circulation problem had been encountered when the well was drilled. The contractor arrived with normal API Class C oil well cement having a mix density of about 14.8 ppg. No liquid or solid extenders were available at the wellsite. Based on the previous calculations it was advised to the contractor to extend the normal slurry density of 14.8 ppg using a mixture of plain water. An initial plain water mix of the class C slurry to 11 ppg was started. This was gradually increased during the pumping operation to 14 ppg for the final section of the job. No lost circulation was encountered and the borehole was filled to the surface level with slurry. Several days later (after cement set) the distance from the surface, though clear water, to the cement top was measured to be 40 feet, (by one system) and 43 feet by another system.

CONCLUSION

While the invention comprises extending and using cement slurries solely by the use of plain water to form Stokes Law slurries, it does not exclude the use of other types of cement additives. For example, the use of cement accelerators, retarders, friction reducers, etc. that are not related to the art of preventing free water by inhibiting or preventing particle settling are within the scope of the invention. Similarly, the use of foamed nitrogen, hollow glass or ceramic spheres, etc. in combination with excess plain water to further lower or reduce density is also contemplated. The foregoing descriptions may make other alternative arrangements apparent to those of skill in the art. The aim of the appended claims is to cover all such changes and modifications that fall within the true spirit and scope of the invention.

What is claimed is:

1. In the method of providing extended density slurries for oil well cementing having lower than normal API class densities, the improvement comprising the step of adding only plain water and no other density extender or particle settling inhibitor to a selected normal API Class slurry to form a Stokes Law Slurry and to extend its density to a lower value and preventing lost circulation and maintaining lost circulation control of the cementing slurry during the well cementing process.

2. The method of claim 1 further including the step of adding: cement accelerator or cement retarder not used as a particle settling inhibitor to the cement slurry.

3. The method of claim 2 wherein a friction reducer is also added.

* * * * *